United States Patent [19]
Menovcik et al.

[11] Patent Number: 6,040,360
[45] Date of Patent: *Mar. 21, 2000

[54] COATING COMPOSITION COMPRISING STABILIZED INORGANIC PIGMENTS

[75] Inventors: Gregory G. Menovcik, Farmington Hills; Thomas C. Balch, West Bloomfield; Hilary P. Davis, Utica; Paul Dudek, Dearborn, all of Mich.

[73] Assignee: BASF Corporation, Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,938

[22] Filed: Jun. 13, 1997

Related U.S. Application Data

[63] Continuation of application No. 08/552,814, Nov. 3, 1995, abandoned.

[51] Int. Cl.[7] .............................. C08K 9/04; C08K 3/20; C08K 3/10
[52] U.S. Cl. ..................... 523/206; 523/200; 524/401; 524/418; 524/420; 524/430; 524/431; 524/539; 524/591; 524/603
[58] Field of Search .................................. 524/539, 430, 524/601, 603, 431, 591; 523/200, 206

[56] References Cited

U.S. PATENT DOCUMENTS

| | | | |
|---|---|---|---|
| 4,752,532 | 6/1988 | Starka | 524/539 |
| 4,791,168 | 12/1988 | Salatin et al. | 524/601 |
| 5,025,061 | 6/1991 | Ishidoya et al. | 524/539 |
| 5,312,877 | 5/1994 | Avci et al. | 524/539 |
| 5,374,691 | 12/1994 | Hintze-Brüning et al. | 524/539 |
| 5,397,391 | 3/1995 | Stramel | 106/447 |
| 5,484,842 | 1/1996 | Lewarchik et al. | 524/601 |
| 5,597,861 | 1/1997 | Nakae et al. | 524/539 |

*Primary Examiner*—Tae Yoon
*Attorney, Agent, or Firm*—Anne Gerry Sabourin

[57] ABSTRACT

A coating composition comprising stabilized inorganic pigments is provided. The coating comprises a pigment treated with a pigment treatment composition of a polyester havng an acid number between 15 and 50 or a phosphate ester or pyrophosphate ester, having an acid number between 10 and 50, solvent, and an amino functional resin.

7 Claims, 1 Drawing Sheet

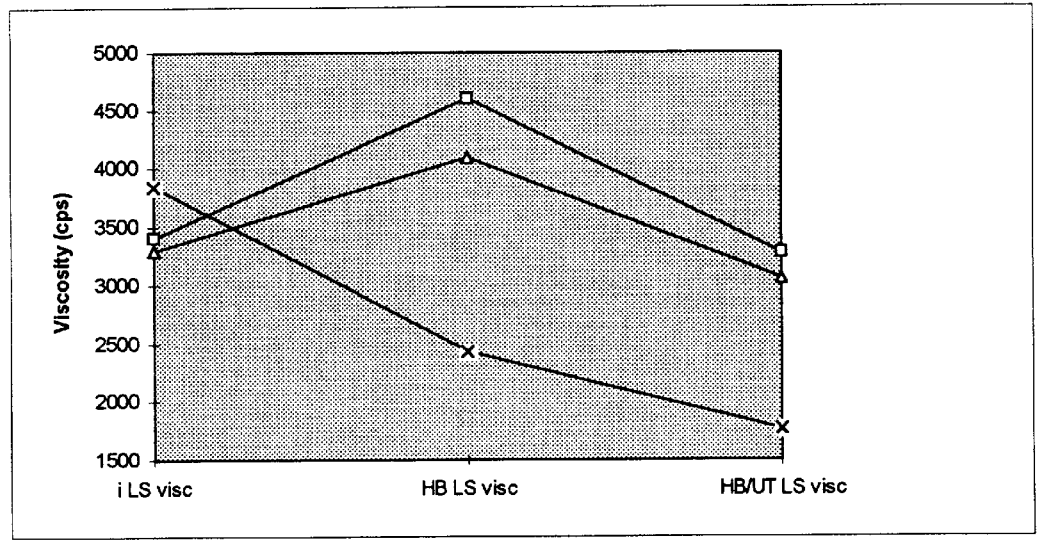

☐ Basecoat composition Ti O₂ pigment paste prepared according to example 2A, ground in pot mill △ Basecoat composition Ti O₂ pigment paste prepared according to example 2A, ground in horizontal mill × Control- TiO₂ ground in acrylic resin, no treatment prior to introducing into coating composition.

iLs visc = initial low shear viscosity

HB LS visc = hot box low shear viscosity

HB/UT LS visc= hot box/ultraturex low shear viscosity

Figure 1

COATING COMPOSITION COMPRISING STABILIZED INORGANIC PIGMENTS

This is a continuation of U.S. patent application Ser. No. 08/552,814, filed Nov. 3, 1995 now abandoned.

BACKGROUND OF THE INVENTION

1. Field of the Invention

The present invention relates to coatings comprising stabilized inorganic pigments. More specifically the invention relates to waterborne coatings comprising inorganic pigments treated with acid functional polyester resins or phosphate esters.

2. Description of the Related Art

Inorganic pigments are included in waterborne coating compositions as the pigment provides desirable color effects. Various problems are encountered in waterborne coatings containing these pigments, when the pigments are utilized without stabilization. These problems include gassing or oxidation of the inorganic pigments when the pigment is exposed to an aqueous environment. The pigment reacts with water to produce hydrogen gas and a metal hydroxide. The reaction is a form of corrosion. The amount of corrosion is measured by the amount of hydrogen gas produced over a given period of time. Corrosion is exacerbated since the reaction results in the continuous formation of $H^+$ and $OH^-$ ions. The $H^+$ ions attack and corrode the pigment and the $OH^-$ ions cause the pH of the environment to further increase. In coating compositions, contact of the inorganic pigment with the aqueous environment is continuous over extended periods of time, since coatings containing the pigment are often stored for 6 months or more before use.

Gassing of the inorganic pigment causes a loss of viscosity of the coating composition and consequent loss of metal control in the coating composition. The result is often a cured film exhibiting a gray color, rather than the desired bright metallic appearance.

An object of the present invention is treatment of inorganic pigment to reduce or eliminate pigment gassing, when the pigment is used in an aqueous environment or in a waterborne coating composition.

SUMMARY OF THE INVENTION

The present invention is a waterborne coating composition comprising stabilized inorganic pigments. The invention further defines a method for stabilizing inorganic pigments for use in waterborne coating compositions.

The method for treating the pigment comprises, first, forming a pigment treatment composition comprising either a polyester resin having an acid number between 15 and 50, or a phosphate or pyrophosphate ester resin having an acid number between 10 and 50, or a mixture thereof. To this resin is added an aminoplast resin, and solvent. The pigment is treated with the pigment treatment composition, by means of spraying, grinding or milling the pigment with the treatment composition, to form the treated pigment. Preferably, the pigment is ground or milled with the pigment treatment composition to form a pigment paste or pigment dispersion.

A coating composition may be formed by adding a treated pigment, as described above, to a principal resin, and optionally adding solvents, pigments, catalysts, hindered amine light stabilizers, ultraviolet light absorbers, rheology control additives and other additives known to those skilled in the art.

DESCRIPTION OF THE DRAWING

FIG. 1 illustrates comparative viscosities of coatings prepared with and without treated pigment.

DETAILED DESCRIPTION OF THE INVENTION

The present invention is a waterborne coating composition comprising inorganic pigments stabilized to inhibit gassing of the pigment in an aqueous media. The invention further defines the method for stabiling the pigment. The pigment is treated by spraying, milling or grinding the pigment with a mixture of polyester having an acid number between 15 and 50 KOH/g or phosphate or pyrophosphate ester having an acid number between 10 and 50 KOH/g, or a mixture of these resins, and aminoplast resin and solvent.

Suitable polyester polymers for purposes of the present invention are those prepared from polyfunctional acids and polyhydric alcohols, wherein the polyester has an acid number between 15 and 50 KOH/g. Preferably the polyester is a branched chain polyester.

Examples of acids used to prepare the polyester include mono, di-, or higher functionality carboxylic acids having carbon chain lengths of 18 or fewer carbon units, as well as longer carboxylic acids, (e.g., C36 dimer fatty acids). It is preferable that the carboxylic acid have two or more carboxylic acid groups. Useful dicarboxylic acid compounds include adipic acid, oxalic acid, malonic acid, succinic acid, glutaric acid, pimelic acid, maleic acid, azeleic acid, sebacic acid, perfluoroazelaic acid and fumaric acid. Aromatic dicarboxylic acids are also preferred. Examples of these acids include isophthalic acid and phthalic acid. Alkylene and aralkylene carboxylic acids can also be used. For purposes of the present invention branched chain polyesters are preferred, and are provided by including an acid compound containing three or more carboxylic acid groups, for example citric acid or trimellitic anhydride.

The polyester resins are synthesized from the above-described carboxylic acid component and a polyol component. The polyester resin may be terminated by hydroxy functionality, acid functionality or hydroxy-acid functionality.

Suitable polyols are 1,4-butanediol, 1,6-hexanediol, neopentyl glycol, ethylene glycol, propylene glycol, diethylene glycol, dipropylene glycol, butylene glycol, glycerol, hydrogenated bisphenol A, cyclohexane dimethanol, caprolactaone diol (i.e., the reaction product of caprolactone and ethylene glycol), hydroxyalkylated bisphenols, trimethylolpropane, pentaerythritol, 2,2,3,3,4,4-hexafluoro-1,5-pentanediol and sorbitol. Suitable alcohols include alcohols derived from fatty alcohols. Particularly preferred are dimer fatty alcohols. For purposes of the present invention, a mixture of 1,6-hexane diol and dimer fatty alcohols is preferred.

The polyester resin in most cases is comprised of one or more polyols, preferably a diol. It may be desirable to include polyols having three or more hydroxy groups, to provide a branched polyester. There may be a small amount of monoalcohol present in the polyol component, particularly if larger proportions of higher functional alcohols are used. These monoalcohols serve as chain terminators. In certain instances, for example, where certain high molecular weight polyols are used, the polyols can be largely or even entirely made up of compounds of functionality greater than two.

Also suitable for purposes of the present invention are phosphate esters and pyrophosphate esters. The phosphate and pyrophosphate esters suitable for purposes of the present invention have the formulae:

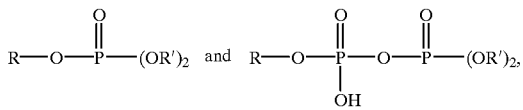

respectively. In these formulae R represents a monovalent lower alkyl radical containing from 1 to 15 carbon atoms, R' is hydrogen, or a hydrocarbon radical selected from the group consisting of monovalent lower alkyl radicals containing from 1 to 10 carbon atoms, or a phenyl radical. Preferred phosphate and pyrophosphate esters include trialkyl phosphates, tricresyl phosphate, phosphites, and esters of phosphoric and phosphorous acid. Examples of these include, isodecyl diphenyl phosphate; tributoxyethyl phosphate; and the phosphate ester of a diethylamine and phosphoric acid, where the diethyl amine is 2-hexyloxyethyl ester diethylamine salt, diethylamine or a mixture of the two.

Aminoplast resins suitable for purposes of the present invention are aldehyde condensation products of melamine, urea, and similar compounds. Products obtained from the reaction of formaldehyde with melamine, urea or benzoguanamine are most common and are preferred. However, condensation products of other amines and amides can also be employed, for example, aldehyde condensates of triazines, diazines, triazoles, guanidines, guanamines and alkyl- and aryl-substituted ureas and alkyl- and aryl-substituted melamines. Some examples of such compounds are N,N-dimethylurea, benzourea, dicyandiamide, formoguanamine, acetoguanamine, ammeline, 2-chloro-4,6-diamino-1,3,5-triazine, 6-methyl-2,4-diamino-1,3,5-triazine, 3,5-diamino-triazole, triaminopyrimidine, 2-mercapto-4,6-diaminopyrimidine, 2,4,6-triethyltriamino-1,3,5-triazine, and the like.

While the aldehyde employed is most often formaldehyde, other similar condensation products can be made from other aldehydes, for example, acetaldehyde, crotonaldehyde, acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols, as methanol, ethanol, propanol, butanol, pentanol, hexanol, heptanol and others, as well as benzyl alcohol and other aromatic alcohols, cyclic alcohols for example cylohexanol, monoethers of glycols such as Cellosolves and Carbitols™ (Union Carbide), and halogen-substituted or other substituted alcohols, such as 3-chloropropanol. The preferred amine-aldehyde resins are etherified with methanol or butanol.

Inorganic pigments suitable for the present invention include titanium dioxide, ferrous pigments, chromium pigments such as chromium oxide, zinc chromate, lead chromate, lead pigments, zinc pigments, antimony oxide, cadmium sulfide, cadmium selenide, and nickel titanate. The present invention is particulary useful for the inorganic oxide pigments of iron, chromium, lead and titanium dioxide. The present invention is also useful for inorganic pigments treated with aluminum oxide.

Suitable solvents for purposes of the present invention include butyl cellosolve®, n-propoxy propanol, sold under the trademark Propyl Proposol®, propylene glycol monomethyl ether and propylene glycol monobutyl ether.

The pigment treatment composition is applied to one or more inorganic pigments by spraying or otherwise mixing the treating agent with the pigment. The treatment can be applied by the addition of the treating agent to the intensified bar of a V-blender or by spraying the treating agent into a screw conveyor or paddle mixer containing the pigments. In a preferred embodiment, the pigment treatment composition and the inorganic pigment are mixed together and the pigment is ground using a horizontal mill or other suitable mill, to form a pigment paste or pigment dispersion. The pigment dispersion may then be added to a principal resin to form a coating composition.

A pigment dispersion is prepared by combining the polyester or phosphate or pyrophosphate ester, or a mixture of these esters, aminoplast resin, solvent and one or more pigments. The polyester, pyrophosphate ester, or phosphate ester is used in an amount between 25.0 and 50.0% by weight, preferably between 30 and 40% by weight. The amino functional resin is used in an amount between 5.0 and 25.0% by weight, preferably between 10.0 and 20.0% by weight. Inorganic pigment is used in an amount between 10.0 and 45.0% by weight, preferably in an amount between 25 and 35% by weight. Solvent is included in an amount between 10.0 and 30.0%, preferably between 10.0 and 20.0% by weight, where all weights are based on total pigment dispersion weight.

A waterborne coating composition is formed from the treated pigment of the present invention, by combining the pigment with a principal resin. Preferably, the pigment is added to the principal resin in the form of a pigment dispersion as described in the preceding paragraph. A neutralizing agent may be added to enhance the water dispersibility of the pigment paste. Suitable neutralizing agents include dimethylethanol amine and aminomethyl propane. The principal resin may be any polymeric resin such as acrylic resins, epoxy resins, amine modified resins, phenolic resins, saturated and unsaturated polyester resins, urea resins, urethane resins, blocked isocyanate resins, carbamate resins and mixtures thereof. The principal resin may further comprise reactive functionality to react with a crosslinking resin. Such reactive functionalities include, but are not limited to hydroxyl, carboxyl, amino, carbamate, carbonate, epoxy, carbodiimide or urea groups, and any other suitable functional group.

The reduced gassing of the pigment is achieved by treating the pigment prior to its introduction to a coating composition. The desired reduction in gassing of the pigment is not accomplished by adding the pigment treatment composition to the coating composition containing pigment.

Other additives may be added to the coating composition, including solvents, pigments, catalysts, hindered amine light stabilizers, ultraviolet light absorbers, rheology control additives, crosslinking agents and other additives known to one skilled in the art.

Waterborne coating compositions containing the inorganic pigments treated according to the present invention exhibited decreased gassing of the inorganic pigment and improved rheology control, in contrast to waterborne basecoat compositions utilizing the pigments without the treatment. FIG. 1 illustrates the improved rheology control, as it shows the viscosity of the coatings containing the treated pigments increases in comparison to the coating with untreated pigments.

FIG. 1 illustrates the initial low shear viscosity, (iLS visc); a low shear viscosity of samples following a hot box treatment (HB LS visc); and a low shear viscosity following hot box treatment and subsequent Ultraturrax® treatment (HB/UT LS visc). All low shear viscosity readings were measured on a Brookfield® viscometer at a shear of 2 sec$^{-1}$. The initial low shear viscosity (iLS visc) was measured before the coating was subjected to any treatment procedures.

The pigment dispersion is present in an amount between 1.0 and 20.0% by weight based on total coating composition weight.

The hot box low shear viscosity (HB LS visc) was measured after the waterborne basecoat sample, prepared according to Example 3, was subjected to hot box testing. The hot box test is conducted by adjusting the pH to 8.0 with dimethyl ethanol amine. The viscosity is measured at high shear of 426 sec$^{-1}$ on the Brookfield® viscometer. The basecoat is adjusted to spray viscosity with deionized water and high shear viscosity is measured again. The basecoat sample is then subjected to high shear at 8000 RPM, in a high shear apparatus such as an Ultraturrax®. The high shear apparatus serves to activate the rheology control agent. The basecoat sample is then placed in a 110° F. oven for 5 days. The samples then are allowed to cool to room temperature. Viscosity measurements are then performed. The (HB LS visc) in FIG. 1, indicates the viscosity measured at this point.

For samples subjected to the Hot Box and treatment in the Ultraturrax® (HB/UT LS visc), following removal from the oven, the sample was subjected to high shear in an Ultraturrax® again, and the viscosity was then measured. FIG. 1 illustrates the viscosity following the second treatment in an Ultraturrax® processor.

The present invention is further illustrated by the following non-limiting examples.

EXAMPLES

Example 1

Polyester Polymer

| Description | Amount |
| --- | --- |
| DIMER FATTY ACID | 29.06 |
| HEXANE DIOL | 28.54 |
| ISOPHTHALIC ACID | 8.30 |
| TOLUENE | 1.21 |
| TRIMELLITIC ANHYDRIDE | 11.16 |
| DIMETHYL ETHANOL AMINE | 0.01 |
| BUTYL ALCOHOL | 12.07 |
| N-PROPOXY PROPANOL | 9.65 |
| Total | 100.0 |

Example 2

Pigment Grind Resin Formulations

| | Example | | | |
| --- | --- | --- | --- | --- |
| Ingredient | Ex. 2A | EX. 2B | Ex. 2C | Ex. 2D |
| Polyester Resin from Ex. 1 | 40.00 | 30.61 | 40.00 | 35.00 |
| Melamine Resin[a] | 15.00 | 15.00 | 15.00 | 19.06 |
| Polyether grafted acrylic | — | 13.51 | — | — |
| n-propoxy proposol | 15.00 | 10.88 | 14.42 | 15.94 |
| Titanium Dioxide Pigment | 30.00 | 30.00 | 30.00 | 30.00 |
| Dimethylethanol amine | — | — | 0.58 | — |
| Total | 100.00 | 100.00 | 100.00 | 100.00 |

[a]High imino fully methylated melamine resin, available under the trademark Cymel ® 327 from Cytec.

Example 3

Basecoat Formulation with Treated Titanium Dioxide Pigment

| INGREDIENT | AMOUNT (% By Weight based on total coating composition weight) |
| --- | --- |
| Rheology Control Agent[1] | 25.32 |
| Melamine Resin[2] | 3.02 |
| Polyurethane Resin | 37.14 |
| TiO$_2$ Pigment Dispersion (Ex. 2A) | 4.47 |
| Black pigment dispersion | 0.62 |
| White pigment dispersion | 0.27 |
| Red pigment dispersion | 0.22 |
| Ultraviolet Light Absorber | 0.34 |
| Flow Control Agent | 0.86 |
| Aluminum Slurry | 17.23 |
| Dimethyl ethanol amine | 0.04 |
| n-propoxy propanol | 0.69 |
| Deionized water | 9.78 |
| Total | 100.00 |

[1]Rheology Control agent is a 3.5% Laponite solution
[2]Melamine resin is Cymel 327 from American Cyanamid, of Wayne, New Jersey.

We claim:

1. A waterborne coating composition comprising a principal resin selected from the group consisting of polyurethane resins, acrylic resins and mixtures thereof, water, an inorganic pigment used in mixture with a pigment treatment composition comprising ester resin selected from the group consisting of polyester, phosphate ester and pyrophosphate ester resins, aminoplast resin and solvent, wherein the pigment is selected from the group consisting of titanium dioxide, iron oxides, chromium oxides, lead oxides, zinc chromate, antimony oxides, cadmium sulfide, cadmium selenide and nickel titanate and any of the preceding pigments treated with aluminum oxides, and mixtures thereof, treated by a method of a) forming a pigment treatment composition comprising
   i) 25.0 to 65% by weight based on total pigment treatment composition weight of a resin selected from the group consisting of polyester resins having an acid number between 15 and 50, and phosphate ester and pyrophosphate ester resins having an acid number between 10 and 50, and
   ii) 5.0 to 25.0% by weight based on total pigment treatment composition of an aminoplast resin, and
   iii) 10 to 45% by weight based on total pigment treatment composition of solvent selected from the group consisting of ethylene and propylene glycol ethers,
 b) combining the pigment treatment composition and the inorganic pigment to form a mixture c) grinding the pigment mixture to form a pigment paste, and d) forming a dispersion of the pigment grind, wherein the dispersion comprises between 1 and 20.0% by weight of the coating composition.

2. The waterborne coating composition of claim 1, wherein the coating composition further comprises compounds selected from the group consisting of solvents, pigments, catalysts, hindered amine light stabilizers, ultraviolet light absorbers, flow control additives, rheology control additives, crosslinking agents and mixtures thereof.

3. The waterborne coating composition of claim 1, wherein the polyester resin used to treat the pigment is a branched polyester resin comprising the reaction product of acid functional compounds selected from the group consisting of dimer fatty acid, isophthalic acid, phthalic acid, citric acid, the corresponding anhydrides thereof and mixtures thereof, and an alcohol selected from the group consisting of 1,4-butanediol, 1,6-hexanediol, neopentyl glycol, ethylene glycol, propylene glycol, diethylene glycol, dipropylene glycol, butylene glycol, butanol and mixtures thereof.

4. The waterborne coating composition of claim 1, wherein the aminoplast resin is a melamine resin.

5. The waterborne coating composition of claim 1, wherein the polyester, phosphate or pyrophosphate ester is present in the pigment treatment composition in an amount between 30.0 and 40.0% by weight based on total treatment composition weight.

6. The waterborne coating composition of claim 1, wherein the aminoplast resin is present in an amount between 10.0 and 20.0% by weight, based on total treatment composition weight.

7. The waterborne coating composition of claim 1, wherein solvent is present in an amount between 10.0 and 20.0% by weight, based on total pigment treatment composition weight.

* * * * *